(12) United States Patent
Bendixen et al.

(10) Patent No.: US 7,421,361 B2
(45) Date of Patent: Sep. 2, 2008

(54) AUTOMATED FACTORY INSTALL PRINTER TEST PROCESS

(75) Inventors: Rudolf V. Bendixen, Austin, TX (US); Christopher Jameyson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 253 days.

(21) Appl. No.: 11/389,924

(22) Filed: Mar. 27, 2006

(65) Prior Publication Data

US 2007/0226733 A1    Sep. 27, 2007

(51) Int. Cl.
G06F 19/00 (2006.01)
G06F 9/44 (2006.01)
G01R 31/28 (2006.01)

(52) U.S. Cl. .................. 702/108; 717/124; 714/724
(58) Field of Classification Search .................. 702/108, 702/121, 123; 717/124, 174; 710/62, 63, 710/64; 719/310, 316; 714/724, 733
See application file for complete search history.

(56) References Cited

U.S. PATENT DOCUMENTS

| | | | |
|---|---|---|---|
| 6,327,706 B1 | 5/2001 | Amberg et al. ................. 717/11 |
| 6,543,047 B1 | 4/2003 | Vrhel, Jr. et al. ............. 717/121 |
| 6,598,223 B1 | 7/2003 | Vrhel, Jr. et al. ............. 717/174 |
| 6,842,856 B2 * | 1/2005 | Shenassa et al. ............... 713/1 |
| 6,882,951 B2 | 4/2005 | Eden et al. .................... 702/121 |
| 2003/0023914 A1 * | 1/2003 | Taylor et al. ................. 714/733 |
| 2003/0037177 A1 * | 2/2003 | Sutton et al. ................. 709/316 |
| 2005/0273681 A1 * | 12/2005 | Hopkins ...................... 714/724 |

* cited by examiner

*Primary Examiner*—Bryan Bui
(74) *Attorney, Agent, or Firm*—Hamilton & Terrile, LLP; Stephen A. Terrile

(57) ABSTRACT

A system for performing an automated factory install peripheral test process. The system is configured so that peripherals (e.g., printers) to be tested are coupled to a hub (such as a USB hub) that is then coupled to a download test system. The download test system is coupled to the network to allow for factory install download testing. The peripherals to be tested are all plugged in to a controllable power source (such as a controllable power strip). This power source is coupled to the download test system via, e.g., a USB connection, thus allowing commands to be sent to the power source by the download test system. The peripherals being tested each have their power buttons set to an on position, but the power source is initially set so that none of the peripherals have power applied to them.

16 Claims, 4 Drawing Sheets

AUTOMATED FACTORY INSTALL PRINTER TEST PROCESS

BACKGROUND OF THE INVENTION

1. Field of the Invention

The present invention relates to the field of information handling systems and more particularly to an automated factory install printer test process.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

It is known to install software and to perform tests on information handling systems before they are shipped to businesses or individual customers. A goal of software installation is to efficiently produce a useful, reliable information handling system. Software installation often includes loading a desired package of software onto the information handling, preparing appropriate environment variables for the computer, and preparing appropriate initialization files for the loaded software.

When installing hardware and software onto multiple information handling systems in a manufacturing environment, identifying a unique software or hardware order across multiple information handling systems is desirable. A software order is unique if all the software parts and parameters that are installed in a system are unique in combination. A hardware order is unique when all of the hardware parts of that order are unique in combination.

Installable images have been identified as a means for reducing system setup times while also providing well tested, self contained packages to be deployed as a whole to a client system. To support flexibility in a build to order environment, a large number of images need to be created and refreshed. This is especially important when a new version of an operating system becomes available.

The testing of factory install packages for peripherals such as printers provides a unique challenge. Unlike other devices, the peripheral is not (and can not) be connected to a test machine during factory install download testing. Accordingly, to fully test that factory install packages are working as designed, a peripheral should be attached to the test machine after the download is completed to run the tests necessary to validate the factory install package. The peripheral then needs to be disconnected before the next download is executed. The need to disconnect the peripheral prevents the use of a test automation model where multiple downloads can be configured with automated tests executed between each download. As a result, testing of factory install packages for peripherals can involve a great deal of manual interaction.

Accordingly, it is desirable to provide a system which can perform an automated factory install peripheral test process.

SUMMARY OF THE INVENTION

In accordance with the present invention, a system for performing an automated factory install peripheral test process is set forth. The system is configured so that peripherals (e.g., printers) to be tested are coupled to a hub (such as a USB hub) that is then coupled to a download test system. The download test system is coupled to the network to allow for factory install download testing. The peripherals to be tested are all plugged in to a controllable power source (such as a controllable power strip). This power source is coupled to the download test system via, e.g., a USB connection, thus allowing commands to be sent to the power source by the download test system. The peripherals being tested each have their power buttons set to an on position, but the power source is initially set so that none of the peripherals have power applied to them.

The automated peripheral software test system creates a set of download configurations necessary to validate factory install peripheral packages. The set of download configurations are queued up for download onto a test system. The system also generates a test script which is queued up in an autodrive function to execute after each download completes. As each download configuration completes execution, the download test system reboots and executes the autodrive test program for the next peripheral to be tested. For each download configuration, the autodrive test program sends a signal to a power source to turn on power for the peripheral being tested. The automated test script for the peripheral is then executed. Results of the test script are posted to the autodrive test program. The autodrive test program completes the test by sending another signal to the power source to turn off power to the peripheral being tested. This process is then repeated for each configuration on each peripheral being tested.

This process results in significant time and manpower savings associated with the printer testing. Also, by programmatically verifying the printer driver installation, more detailed information can be verified. This process achieves a goal of automating a factory install test process.

In certain embodiments, the test software interacts with the power source such that the software maintains knowledge of which printer is attached to which outlet. The test software interacts with the autodrive script and the download test system to identify the printer in the download and turn it on or off as appropriate.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
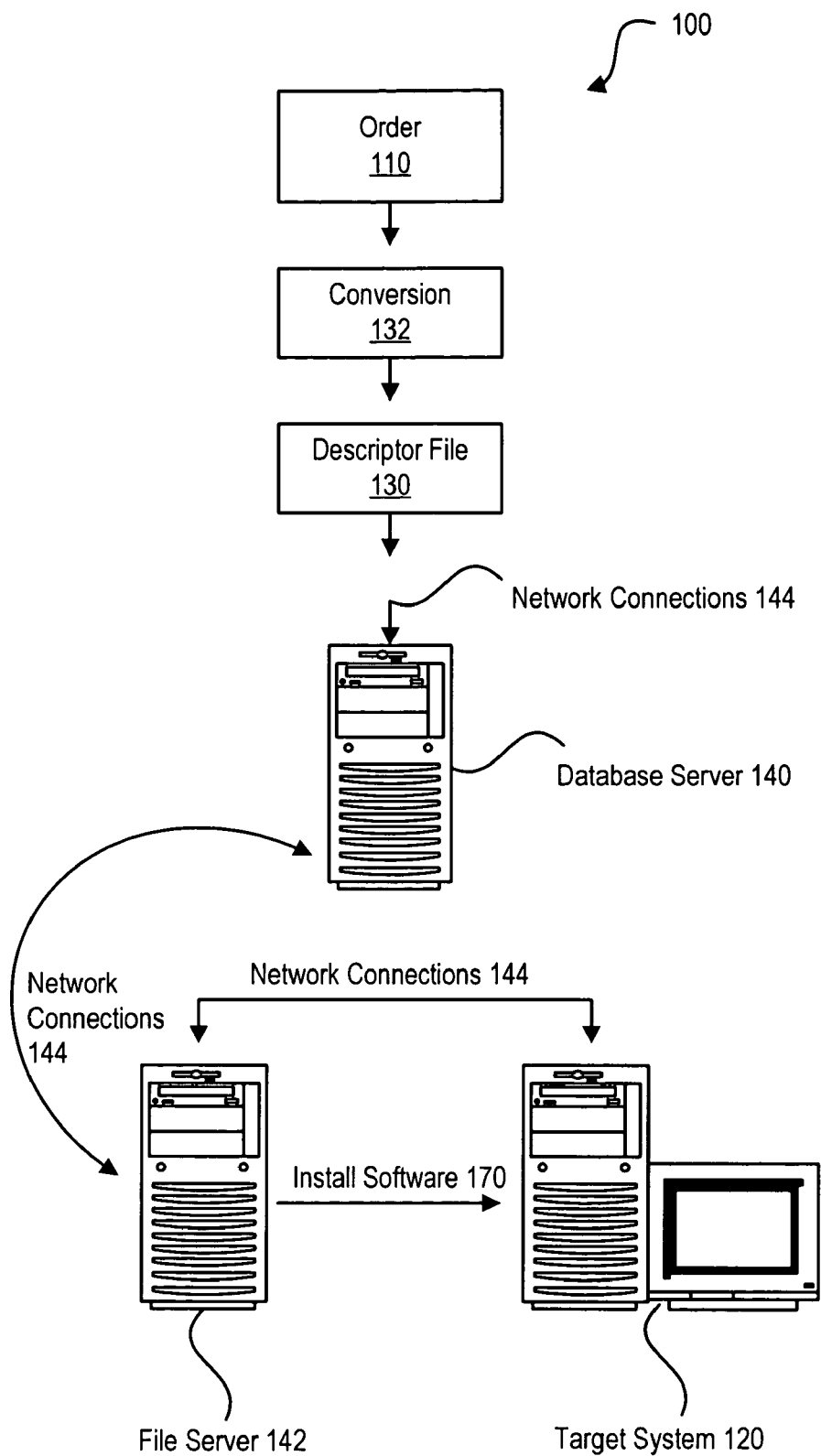
FIG. 1 shows a schematic diagram of a system for installing software.

FIG. 1 is a schematic diagram of a software installation system 100 at an information handling system manufacturing site. In operation, an order 110 is placed to purchase a target information handling system 120. The target information handling system 120 to be manufactured contains a plurality of hardware and software components. For instance, target information handling system 120 might include a certain brand of hard drive, a particular type of monitor, a certain brand of processor, and software. The software may include a particular version of an operating system along with all appropriate driver software and other application software along with appropriate software bug fixes. The software may also include driver software for various peripherals. Before target information handling system 120 is shipped to the customer, the plurality of components are installed and tested. Such software installation and testing advantageously ensures a reliable, working information handling system which is ready to operate when received by a customer. Because the peripherals may not be coupled to the information handling system 120 during the manufacture process, the testing of the drivers for the peripherals is performed before the components are installed on the target information handling system 120.

Because different families of information handling systems and different individual computer components may require different software installations, it is desirable to determine which software to install on a target information handling system 120. A descriptor file 130 is provided by converting an order 110, which corresponds to a desired information handling system having desired components, into a computer readable format via conversion module 132.

Component descriptors are computer readable descriptions of the components of target information handling system 120 which components are defined by the order 110. In a preferred embodiment, the component descriptors are included in a descriptor file called a system descriptor record which is a computer readable file containing a listing of the components, both hardware and software, to be installed onto target information handling system 120. Having read the plurality of component descriptors, database server 140 provides a plurality of software components corresponding to the component descriptors to file server 142 over network connection 144. Network connections 144 may be any network connection well-known in the art, such as a local area network, an intranet, or the internet. The information contained in database server 140 is often updated such that the database contains a new factory build environment. The software is then installed on the target information handling system 120 via file server 142.

Figure 2:
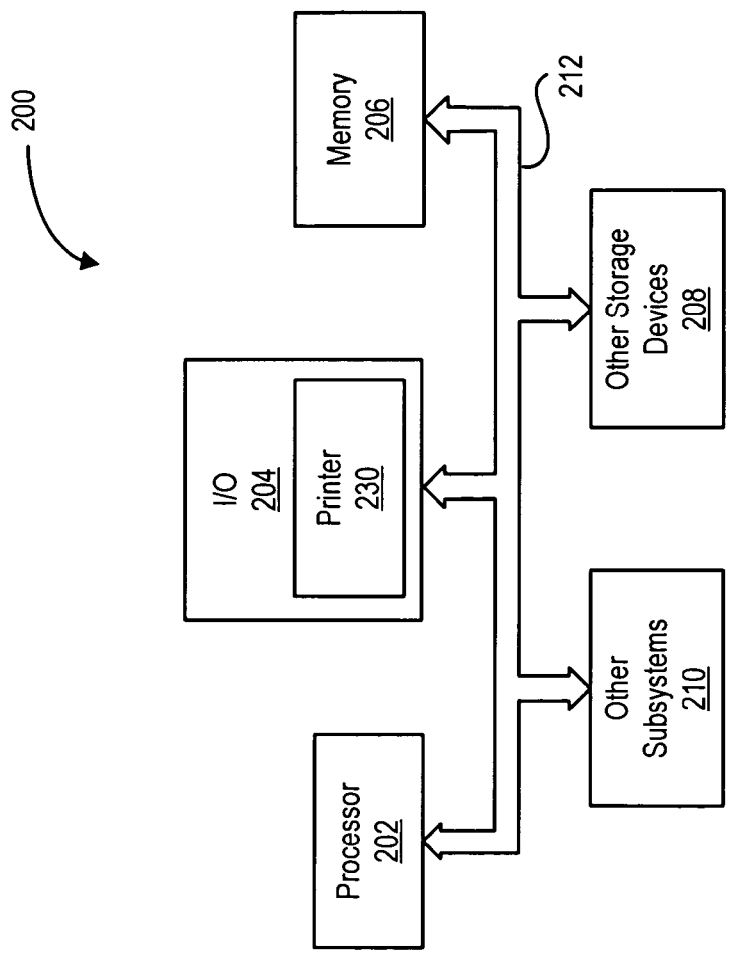
FIG. 2 shows a system block diagram of an information handling system.

Referring briefly to FIG. 2, a system block diagram of an information handling system 200 is shown. The information handling system may be the target information handling system or may be a download test system. The information handling system 200 includes a processor 202, input/output (I/O) devices 204, such as a display, a keyboard, a mouse, and associated controllers, memory 206 including non-volatile memory such as a hard disk and drive and volatile memory such as random access memory, and other storage devices 208, such as a floppy disk and drive and other memory devices, and various other subsystems 210, all interconnected via one or more buses 212. Information handling system 200 may also include a printer or printing device 230 as an example of an I/O device 204. The information handing system also includes the appropriate drivers stored within the memory 206 for the printer 230. If the information handling system is a download test system, then the test software is stored on the memory and executed by the processor.

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O devices, such as a keyboard, a mouse, and a video display. The information handling system may also include one or more buses operable to transmit communications between the various hardware components.

Figure 3:
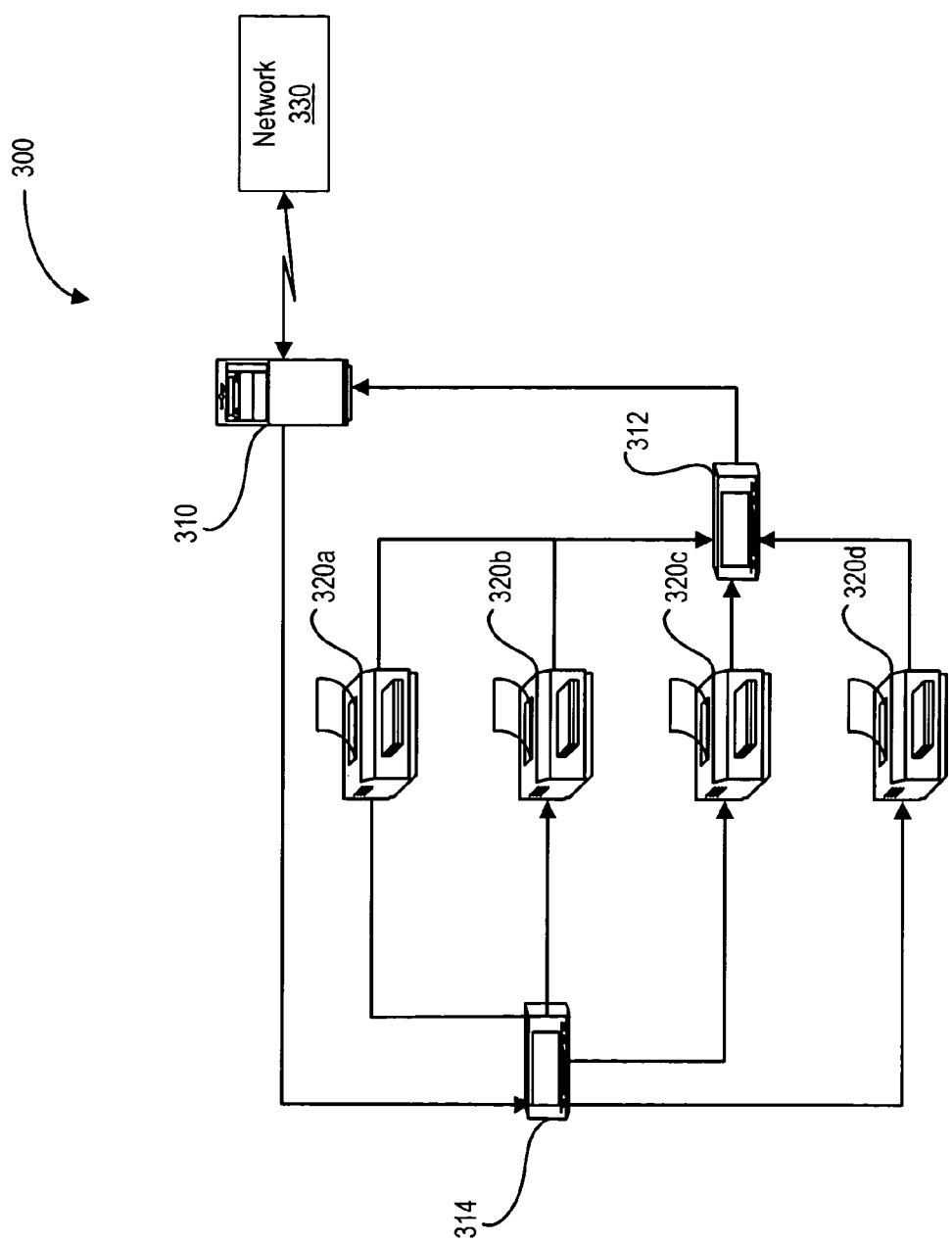
FIG. 3 shows a system block diagram of a system for performing an automated factory install printer test.

FIG. 3 shows a system block diagram of a system 300 for performing an automated factory install peripheral test. The system for performing an automated factory install peripheral test 300 includes a download test system 310, a hub 312 and a controllable power source 314. The system also includes a plurality of peripherals 320 to be tested. In a preferred embodiment, the peripherals are printers.

The system is configured so that peripherals 320 to be tested are coupled to the hub 312 (such as a USB hub) which is in turn coupled to the download test system 310. The download test system 310 is coupled to a network 330 to allow for factory install download testing. The peripherals 320 to be tested are coupled (e.g., plugged in) to the controllable power source 314 (such as a common power strip). This power source 314 is coupled to the download test system 310 via, e.g., a USB connection, thus allowing commands to be sent to the power source 314 by the download test system 310. The peripherals 320 being tested each have their respective power buttons set to an on position, but the power source 314 is initially set so that none of the peripherals 320 have power applied to them.

The automated peripheral software test system creates a set of download configurations necessary to validate factory install peripheral packages. The set of download configurations are queued up for download onto a test system. The system also generates a test script which is queued up in an autodrive function to execute after each download completes. As each download configuration completes execution, the download test system reboots and executes the autodrive test program for the next peripheral to be tested. For each download configuration, the autodrive test program sends a signal to a power source to turn on power for the peripheral being tested. The automated test script for the peripheral is then executed. Results of the test script are posted to the autodrive test program. The autodrive test program completes the test by sending another signal to the power source to turn off power to the peripheral being tested. This process is then repeated for each configuration on each peripheral being tested.

Figure 4:
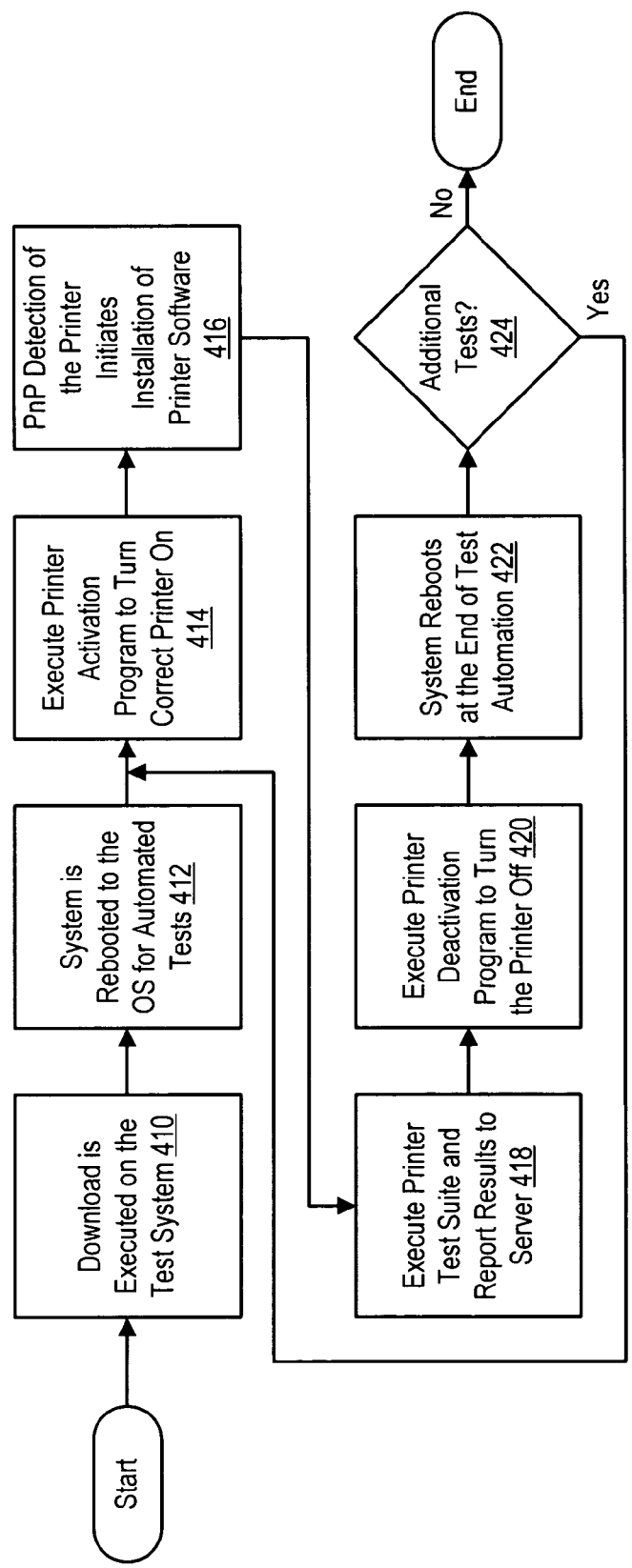
FIG. 4 shows a flow chart of the operation of the system for performing an automated factory install printer test.

More specifically, FIG. 4 shows a flow chart of the operation of the system 300 for performing an automated factory install printer test. The system begins operation by downloading tests to be executed by the download test system at step 410. The download test system 310 is then rebooted to the operating system to execute the automated tests at step 412. The download test system 310 then executes a printer activation program to turn a desired printer on at step 414. The printer activation program enables the download test system 310 to instruct the power source 314 to apply power to a desired printer 320 under test. The download test system 310 then initiates a plug and play (PnP) detection of the printer which initiates installation of the corresponding printer software at step 416. The download test system 310 then executes a printer test suite and reports results to a test server that is coupled via the network 330 at step 418. The download test system 310 then executes a printer deactivation program to turn the printer off at step 418. The printer is turned off by instructing the power source 314 to remove power from the printer 320 under test at step 420. After the printer is turned off, the download test system 310 reboots at step 422. Because the printer has been turned off, the download test system 310 does not detect the printer after the reboot. The download test system 424 then reviews the downloaded tests to determine whether there are additional tests to be performed at step 424. If so, then the download test system 424 executes the printer activation program to turn the correct printer on at step 414. If not, then the automated factory install printer test completes.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, the controllable power source may be accomplished by connecting selectively enabled USB ports of the download test system to the peripheral devices. The USB ports of the system would then be turned on and off (thus applying and removing power to the peripheral devices) using software tools to selectively enable the USB ports. Such a configuration could be used for devices that cannot have a power switch set to ON, such as peripherals that have touch sensitive power buttons.

Consequently, the invention is intended to be limited only by the spirit and scope of the appended claims, giving full cognizance to equivalents in all respects.

What is claimed is:

1. A method for automatically testing a factory install image for a peripheral, the method comprising:
   coupling the peripheral to a controllable power source;
   coupling the controllable power source to a download test system;
   booting the download test system while the peripheral is powered down;
   turning on the peripheral via the controllable power source; and,
   executing a peripheral test on the peripheral via the download test system, the peripheral test automatically testing the factory install image for the peripheral.

2. The method of claim 1, further comprising:
   reporting results of the peripheral test to the download test system.

3. The method of claim 1, wherein:
   turning on the peripheral causes the download test system to perform a plug and play detection operation, the plug and play detection operation detecting the powered on peripheral.

4. The method of claim 3, wherein:
   the peripheral test is executed after the plug and play detection operation completes.

5. The method of claim 1, further comprising:
   executing a peripheral deactivation operation after completion of the peripheral test, the peripheral deactivation operation removing power from the peripheral.

6. The method of claim 1, further comprising:
   testing a plurality of peripherals.

7. The method of claim 1, wherein:
   the peripheral includes a printer.

8. The method of claim 1, wherein:
   the controllable power source is a universal serial bus (USB) port included within the download test system; and
   turning on power via the controllable power source is accomplished by selectively enabling the USB port to which the peripheral is coupled.

9. An apparatus for automatically testing a factory install A image for a peripheral, the apparatus comprising:
   a controllable power source coupled to the peripheral;
   means for coupling the controllable power source to a download test system;
   means for booting the download test system while the peripheral is powered down;
   means for turning on the peripheral via the controllable power source; and,
   means for executing a peripheral test on the peripheral via the download test system, the peripheral test automatically testing the factory install image for the peripheral.

10. The apparatus of claim 9, further comprising:
    means for reporting results of the peripheral test to the download test system.

11. The apparatus of claim 9, wherein:
turning on the peripheral causes the download test system to perform a plug and play detection operation, the plug and play detection operation detecting the powered on peripheral.

12. The apparatus of claim 11, wherein:
the peripheral test is executed after the plug and play detection operation completes.

13. The apparatus of claim 9, further comprising:
means for executing a peripheral deactivation operation after completion of the peripheral test, the peripheral deactivation operation removing power from the peripheral.

14. The apparatus of claim 9, further comprising:
means for testing a plurality of peripherals.

15. The apparatus of claim 9, wherein:
the peripheral includes a printer.

16. The apparatus of claim 9, wherein:
the controllable power source includes a selectively enabled universal serial bus (USB) port included within the download test system; and
turning on power via the controllable power source is accomplished by selectively enabling the USB port to which the peripheral is coupled.

* * * * *